3,175,919
ZIRCONIA REFRACTORY
Thomas W. Smoot, Bethel Park, and Joseph R. Ryan, Irwin, Pa., assignors to Harbison-Walker Refractories Company, Pittsburgh, Pa., a corporation of Pennsylvania
No Drawing. Filed June 6, 1962, Ser. No. 200,356
4 Claims. (Cl. 106—57)

This invention relates to the manufacture of zirconia refractory shapes and, more particularly, to the manufacture of thermal shock resistant zirconia refractory shapes.

Zirconia has the formula $ZrO_2$ and is a known, high melting point oxide. Zirconia, under different temperature conditions, exists in three different crystalline forms: the monoclinic, the tetragonal, and the cubic. The monoclinic form usually exists between zero and about 1000° C. The tetragonal exists between about 1000° C. and 1900° C., and the cubic form exists from about 1900° C. to melting at 2700° C.

In a pure system, these crystal phase transformations are reversible, but the phase changes are always accompanied by an appreciable and undesirable variation in density with a commensurate permanent volume change. Thus, although zirconia, and particularly the cubic phase, appears desirable for refractory purposes, its tendency to at least partially change its crystalline makeup, with eventual destruction of refractory shapes fabricated thereof, has restricted its use. Therefore, to use the otherwise desirable refractory oxide which zirconia is, workers in the art have produced what is termed "stabilized zirconia."

Stabilized zirconia is zirconia substantially entirely exhibiting a cubic crystalline structure the individual crystals of which are "propped," as it were, to prevent phase alterations regardless of variations in temperature. For example, calcium oxide is conventionally used to produce a stabilized zirconia refractory material. In one method, stabilization is brought about by mixing from 3 to 6%, by weight, of 99+% purity calcium oxide with 97 to 94%, by weight, zirconia. All of the calcium oxide and zirconia is very finely divided i.e., 100% —325 mesh. The mixture is heated to about 2900° F. and held for a period of time sufficient to induce stabilization of the zirconia crystals. Complete stabilization theoretically requires 5.85%, by weight, of calcium oxide. The product which results is assigned the formula $CaO \cdot ZrO_2$.

Material selected to stabilize zirconia must have an ionic radius substantially the same as the ionic radius of the zirconium ion. The zirconium ion, in cubic configuration, has an ionic radius of about .87 angstrom unit. $Ca^{++}$ ions exhibit an average ionic radius of about 1.06 angstroms. Other materials having an ion radius within about ±20% of the .87 angstrom radius of the zirconium are also usable. For example, $Mg^{++}$, having an ionic radius of about 0.78 angstrom, is a suitable stabilizer. $Y^{+++}$, which has an ionic radius of about 1.06 angstroms, is also usable. In stabilizing zirconia, ions which make up the material used for stabilization appear to enter the cubic structure of the zirconia. The minor differences in ionic radius involved in these substitutions apparently prevent the phase changes which take place in the pure state, thereby stabilizing the structure in the cubic phase. The thus "stabilized" cubic zirconia crystals exhibit remarkably uniform reversible thermal expansion. Such stabilized zirconia is remarkably inert to various corrosive oxides, slags and metals, and is a very desirable material for some applications.

The thermal expansion, however, exhibited by stabilized zirconia is about 0.6% per 1000° F. Also, it has low thermal conductivity, amounting to about 5 B.t.u./ft.$^2$/in./° F./hr.

The high thermal expansion and low thermal conductivity, in a refractory shape, sometimes result in spalling due to the resulting thermal gradient between the hot face and cold face of the shape in service. Also, the expense of stabilized zirconia has severely delimited its commercial feasibility.

Prior workers have suggested various methods of counteracting the poor thermal shock resistance of stabilized zirconia refractory brick and shapes. These suggestions have included special fusing or sintering operations, or the use of additive materials such as alkaline earth and alkali metal halides, iron oxides, titanium and so forth. However, these methods, while satisfactory for some purposes, have not obtained the thermal shock resistance characteristics desired.

Accordingly, it is an object of this invention to provide a method of fabricating thermal shock resistant stabilized zirconia refractory brick and shapes. It is another object of the invention to provide relatively less expensive stabilized zirconia refractory brick and shapes having good thermal shock resistance and dimensional stability. It is yet another object of this invention to provide a batch material suitable for use in the fabrication of thermal shock resistant stabilized zirconia refractory brick and shapes.

Briefly, according to one embodiment of this invention, thermal shock resistant stabilized zirconia brick and shapes are fabricated from a batch consisting essentially of a preferred graded size range of (1) partially stabilized zirconia aggregate and (2) completely stabilized zirconia in an extremely fine state of subdivision, as a rigid matrix.

The following examples are illustrative of practices according to this invention:

*Example I*

In actual laboratory tests about 65 parts, by weight, of a coarser graded size range of partially stabilized zirconia was mixed with about 35 parts, by weight, of very finely divided completely stabilized zirconia. The partially stabilized zirconia of the coarser fraction was manufactured according to conventional practice from 100 parts, by weight, of $ZrO_2$, and 4 parts, by weight, of CaO to produce partially stabilized zirconia grain having about 3.8%, by weight, of calcium oxide. The degree of stabilization of this material was determined by X-ray techniques to be about 75% ±10% of complete stabilization.

The bulk specific gravity of the partially stabilized material was about 4.75 grams per cc. It was ground to produce aggregate material about 30% —4 +10 mesh Tyler, about 35% —10 +28 mesh Tyler and about 35% —28 mesh Tyler. It was next subjected to a screening step to remove the —28 mesh fraction, thereby providing a —4 +10 to +28 mesh Tyler material. About 65 parts, by weight, of this material was mixed with about 35 parts, by weight, of very finely divided, completely stabilized zirconia material all of which was —28 mesh Tyler, 80%, by weight, thereof being less than —325 mesh Tyler, and 52%, by weight, of the —325 mesh fraction having an average diameter of 3 to 4 microns.

The completely stabilized zirconia fraction was made by reacting 100 parts, by weight, of $ZrO_2$ and 6 parts, by weight, of CaO to thus produce grain having about the theoretical 5.85%, by weight, of calcium oxide necessary for complete stabilization.

The mixture of about 65 parts partially stabilized material and about 35 parts very finely divided completely stabilized material, with about 3.3%, by weight, of a tempering media, were manufactured into brick by power pressing at 8000 p.s.i. The tempering media consisted of water and about 0.5%, by weight, of carboxymethylcellulose. The brick were fired at 2900° F. for 23 hours.

The brick were theoretically 9 x 4½ x 2½" brick, which are termed "9 inch straights" in the art.

The 9-inch dimensions of the brick were measured, and they were then subjected to cyclic temperature variation between 1750° F. and 2700° F. for 400 twenty-minute cycles. After the 400 cycles, the brick were cooled and their 9-inch dimension again measured. There was substantially 0.00 linear change in dimension.

*Example II*

For purposes of comparison, a mixture consisting entirely of 75%±10% stabilized zirconia material was made into brick. This material was manufactured in an electric furnace by fusing zirconia, and about 75% of the amount of calcium oxide theoretically required. This material was crushed to provide a screen analysis of 30%, by weight, −4 +10 mesh Tyler, 35%, by weight, −10 +28 mesh Tyler and the remainder −28 mesh Tyler to fines. Brick was then manufactured in the same manner as that set forth in Example I. These brick were subjected to the same cyclic temperature tests as discussed in Example I. The 9-inch dimensions of the brick were measured, and +3.9% linear expansion had occurred.

*Example III*

In still further comparative tests, completely stabilized zirconia, substantially all of which was −325 mesh Tyler, was sintered to manufacture grain material. The resulting sintered grain material was screened to provide a graded particle size range identical to that of Example I above. Brick was manufactured according to the same techniques used in Examples I and II above. The brick were subjected to the same cyclic temperature tests as those above discussed. After the tests, the 9-inch dimensions were found to have had a 1.1% linear increase.

These comparative tests are clearly indicative of easier manufacture and increased dimensional stability for brick according to this invention, as compared to brick fabricated of completely stabilized sintered, or incompletely stabilized fused, zirconia grain.

In still other tests to determine the relative properties of the brick of Examples I, II and III, they were subjected to high temperature load tests. In these tests, each of the brick was subjected to a 25 pound per square inch pressure load, and the temperature slowly raised to 3300° F. which temperature was maintained for 90 minutes. The brick of Example II failed at 3100° F. The brick of Example III failed at 2900° F. The brick of Example I did not fail but exhibited a linear subsidence of 1.1% after 90 minutes.

The results of the above testing were completely unexpected. Prior workers have suggested that stringently controlled and minor additions of unstablized zirconia could be made to completely stabilized zirconia to obtain a satisfactory product. Such suggestions were apparently predicated upon the desire to fabricate less expensive zirconia refractory materials than those fabricated entirely of the more expensive completely stabilized zirconia. However, we have discovered that a major portion of a less expensive zirconia material i.e., partially stabilized zirconia, can be used to provide satisfactory zirconia refractory shapes when a minor quantity of completely stabilized zirconia in a very finely divided state is mixed therewith. The very finely divided completely stabilized zirconia serves as a rigid matrix material (which will not change crystalline phase with temperature variation), which firmly binds the less rigid, coarser, stabilized zirconia aggregate together (which aggregate will, to some degree, reversibly change crystalline phase with temperature variation). The amount, or quantity, of completely stabilized zirconia is, in the final analysis, dictated by the quantity thereof necessary to form a matrix in a fired body, which will substantially entirely encompass the separate and discrete particles of the partially stabilized zirconia aggregate to thereby provide dimensional stability in a fired refractory shape.

In the foregoing discussion, we have explained the use of our novel combination of partially stabilized and completely stabilized zirconia in a mixture which is particularly applicable to such as power pressing or impact pressing techniques to form refractory shapes. Our invention is equally applicable to the formation of a mixture for slip casting refractory shapes. Actual slip cast shapes, made according to our concepts—in addition to other beneficial characteristics, had low apparent porosity and excellent thermal shock resistance. In making the slip casting mixture, about 48 parts of partially stabilized zirconia and about 52 parts of completely stabilized zirconia were combined with sufficient tempering agent as to allow slip casting techniques to be practiced (the 52 parts of completely stabilized zirconia are dictated by the quantity thereof necessary to form a matrix, substantially entirely encompassing the particles of partially stabilized zirconia). All of the material was less than about 20 microns, about 14% was greater than 10 microns, about 28% between 5 and 10 microns and the remainder less than 5 microns, all parts by weight.

In actual tests, crucible shapes were cast of the foregoing material and fired to over 3000° F. After firing, the crucibles were repeatedly fired to cherry red with intermediate immersion in cold water. After 13 repetitions of such heating and cooling, the crucibles were still in good condition, although they were beginning to show signs of fatigue. These tests establish the excellent thermal shock resistance of zirconia shapes fabricated, according to the concepts of this invention.

In the tests with slip cast material, it was discovered that the fine zirconia particles tended to agglomerize when mixed with the tempering agents. This agglomeration, in initial tests, resulted in fired bodies having upwards of 20% apparent porosity. We discovered, though, that by passing the fluid slip casting mixture through a 100 mesh screen that the agglomerates were eliminated, and that greatly reduced apparent porosity could be obtained in fired products i.e., lower than 4.8%. The agglomerates appear to be made up of particles carrying some manner of electrical charge, and must be disposed of. Even if broken down by forcing through a screen, they will reagglomerate. Furthermore, we discovered that screening of the agglomerates from the slip enabled use of considerably lower firing temperatures. For example, we obtained refractory characteristics at 3300° F. with screened slip, which were better than non-screened slip fired to 3700° F.

This remarkable reduction in apparent porosity, which was obtained by screening the slip, led to still other tests in which a slip casting mixture entirely of completely stabilized zirconia, and a slip casting mixture entirely of partially stabilized zirconia were subjected to similar screening through a 100 mesh screen before pouring into molds. The screening step resulted in considerable reduction in apparent porosity in the resulting fired shapes, establishing the utility of such screening with zirconia material other than our preferred mixture of completely stabilized and partially stabilized zirconia.

Having thus described the invention in detail and with sufficient particularity as to enable those skilled in the art to practice it, what is desired to have protected by Letters Patent, is set forth in the following claims.

We claim:

1. A refractory batch consisting essentially of a mixture of two ingredients, these two ingredients being partially stabilized zirconia grain which is 75±10% stabilized and grain which is completely stabilized zirconia, the completely stabilized zirconia grain being finer than the partially stabilized zirconia grain, there being sufficient of said completely stabilized zirconia grain to serve as a rigid, dimensionally stable matrix upon forming and firing of the batch, which matrix substantially entirely encompasses the separate grain particles of the partially stabilized zirconia to thereby provide a dimensionally-stable refractory shape on firing, the partially stabilized grain constituting at least about the major weight portion of the batch.

2. The refractory batch of claim 1 in which substantially all of the partially stabilized zirconia is −4 +28 mesh Tyler and the completely stabilized zirconia is substantially all −65 mesh Tyler, the major portion of the completely stabilized zirconia being less than about −325 mesh Tyler, and the average particle diameter of the −325 mesh completely stabilized zirconia averaging from about 3 to 4 microns.

3. A fired refractory shape fabricated from a batch consisting essentially of a mixture of two ingredients, these two ingredients being partially stabilized zirconia grain which is 75±10% stabilized grain, and zirconia grain which is completely stabilized, said partially stabilized zirconia grain constituting at least about the major weight portion of said fired shape, and there being sufficient of said completely stabilized zirconia grain to constitute a rigid, dimensionally stable matrix substantially entirely encompassing the separate partially stabilized zirconia grain.

4. A refractory batch consisting essentially of about 65 parts, by weight, of a coarser graded size range of partially stabilized zirconia, and about 35 parts, by weight, of very finely divided completely stabilized zirconia, and sufficient tempering media as to allow forming, said partially stabilized zirconia being 75±10% stabilized and substantially all +28 mesh, substantially all of the completely stabilized zirconia being finer than the partially stabilized zirconia.

References Cited by the Examiner
UNITED STATES PATENTS

| | | | |
|---|---|---|---|
| 2,567,592 | 9/51 | Ballard | 106—57 |
| 2,937,102 | 5/60 | Wagner | 106—57 |

OTHER REFERENCES

Phelps: Notes on Casting, Bull. Am. Cer. Soc., volume 20, 1941, pages 313—315.

TOBIAS E. LEVOW, *Primary Examiner*.